Feb. 21, 1928.

M. MORAWIECKI 1,660,013

ELECTROMECHANICAL RAT TRAP

Filed Nov. 30, 1926

INVENTOR
Michal Morawiecki

Patented Feb. 21, 1928.

1,660,013

UNITED STATES PATENT OFFICE.

MICHAL MORAWIECKI, OF TERRACE, PENNSYLVANIA.

ELECTROMECHANICAL RAT TRAP.

Application filed November 30, 1926. Serial No. 151,719.

This invention relates to improvements in traps, particularly rodent traps in which the animal is first stunned by an electric shock and then thrown into a liquid container, and it is the principal object of the invention to provide a trap of this character with means for ensuring a positive action of the trap and for counting the number of animals caught in the trap.

Another object of the invention is the provision of an animal trap of simple and therefor inexpensive construction, yet efficient in operation and durable.

A further object of the invention is the provision of a trap of this type provided with novel means for retarding the motion of the movable electrode in order to ensure at all times a positive action of the trap.

These and other objects and advantages of my invention will become more fully known as the description thereof proceeds, and will then be specifically defined in the appended claims.

In the accompanying drawing, forming a material part of this disclosure:

Figure 1:
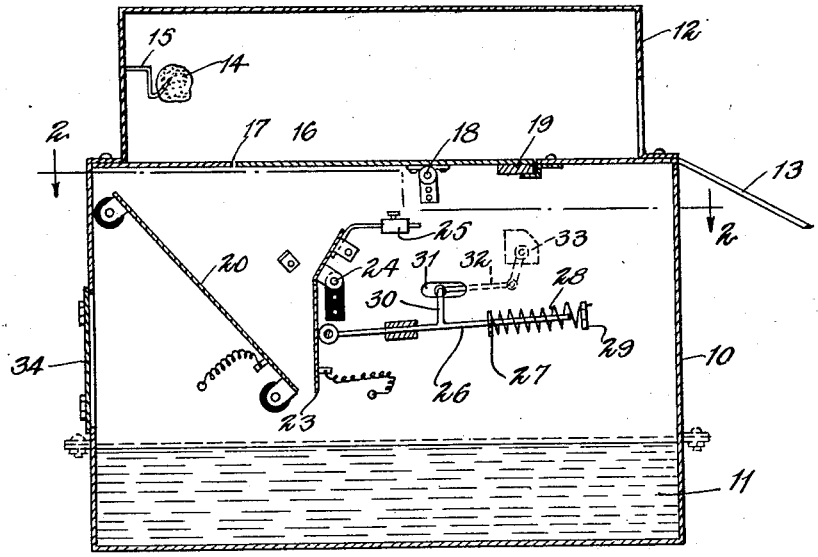
Fig. 1 is a vertical longitudinal section of a trap constructed according to my invention.
Figure 2:
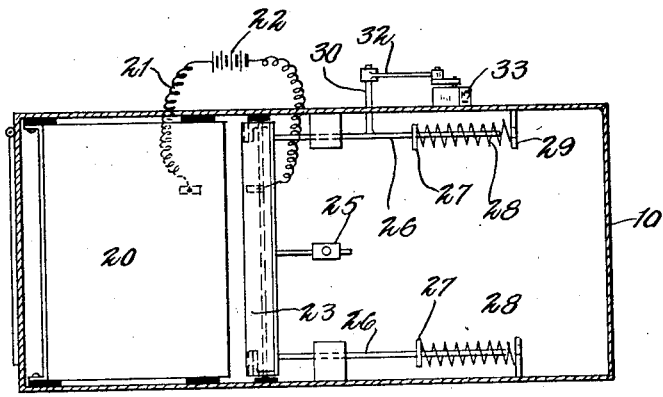
Fig. 2 is a sectional top elevation thereof, the section being taken on line 2—2 of Figure 1.

As illustrated, my invention comprises a container 10 of any desired suitable material and shape adapted to be partly filled with water etc. as indicated at 11, and having an upper housing 12 attached thereto having an opening in one of its end walls allowing the entrance of a rodent or the like traveling along a suitable runway 13 to reach the opening in one of the end walls of housing 12 lured by the bait 14 on a holder 15 secured in the end wall of housing 12 oppositely disposed to the entrance opening.

In order to reach the bait, the rodent has to step on a tiltable platform 16 normally closing the opening 17 in the top of container 10, and swinging about a pivot pin or fulcrum 18, while the rear end of the platform is weighted, as at 19, for returning the same into normal position after an animal has tilted the platform.

The electrical mechanism for stunning the animal and eventually electrocuting the same, comprises an electrode 20 below opening 17 within an electric circuit 21 including a source of electricity 22. The electrode 20 is stationary and suitably insulated, while a second electrode 23, is pivotally mounted, as at 24, and has its lower end in close proximity to electrode 20 but spaced therefrom, normally, and an adjustable weight 25 allows a regulation of the space between both electrodes according to the size of the animals to be stunned.

The motion of the movable electrode is regulated or controlled by a suitable retarding or cushioning device comprising a pair of rods 26, each carrying a collar 27 intermediate its ends against which one end of a spring 28 rests, wound about the end part of the rods, and resting with its other end against abutments 29 on the casing or container walls.

In order to allow the keeping of a count of the number of animals caught in the trap, one of the rods 26 has attached thereto intermediate its ends a rectangularly disposed arm 30, extending through an opening 31 in the container and having connected therewith the operating arm or lever 32 of a counter 33 of any suitable construction.

The caught and dead animals can be removed through a normally closed end door in the container wall.

It is to be understood that I have described and shown as an example one form of my trap, and that such changes as come within the scope of the appended claims can be made without departure from the spirit of my invention as explained.

Having thus described my invention, what I claim as new and desired to secure by Letters Patent is:

1. Animal trap including a stationary and a movable electrode for electrocuting animals caught, comprising a pair of rods connected to the movable electrode, springs cushioning the motions of said rods, an arm connected to one of said rods and extending to the outside of the trap, a counter, and means for connecting said counter to said arm for operating the counter to indicate the number of animals caught.

2. Animal trap including a stationary and a movable electrode, means for adjusting the relative position of the lower end of the movable electrode to the stationary electrode, a pair of arms. springs wound about part of said arms, collars on said arms and abutments on said trap against which the ends of said springs rest for cushioning said arms, an arm rectangularly disposed to and connected with one of said cushioning arms, a counter, an operating lever therefor, and a connection between said lever and said rectangularly disposed arm for operating said counter each time an animal has moved the movable electrode against its cushioning means to indicate the number of animals caught in the trap.

Signed at Terrace, in the county of Allegheny, and State of Pennsylvania, this 13th day of November, A. D. 1926.

MICHAL MORAWIECKI.